United States Patent [19]

Spry

[11] Patent Number: 5,161,068
[45] Date of Patent: Nov. 3, 1992

[54] SUPERCONDUCTING SEARCHING FILTER

[75] Inventor: Robert J. Spry, Tipp City, Ohio

[73] Assignee: The United States of America as represented by the Secretary of the Air Force, Washington, D.C.

[21] Appl. No.: 386,798

[22] Filed: Jul. 20, 1989

[51] Int. Cl.$^5$ .......................... G02B 5/24; H01C 7/16
[52] U.S. Cl. ...................................... 359/885; 356/234
[58] Field of Search ............... 356/234, 414; 350/311, 350/312, 317; 505/828, 848; 359/885

[56] References Cited

U.S. PATENT DOCUMENTS

| | | |
|---|---|---|
| H,39 | 3/1986 | Gubser et al. . |
| 3,623,795 | 11/1971 | Taylor et al. . |
| 3,773,684 | 11/1973 | Marks . |
| 3,790,250 | 2/1974 | Mitchell et al. . |
| 3,818,390 | 6/1974 | Gikow et al. . |
| 3,857,114 | 12/1974 | Minet et al. . |
| 3,956,727 | 5/1976 | Wolf . |
| 4,093,353 | 6/1978 | Lang . |
| 4,099,854 | 7/1978 | Decker et al. . |
| 4,114,985 | 9/1978 | Friedman . |
| 4,180,605 | 12/1979 | Gilbert et al. . |
| 4,261,331 | 4/1981 | Stephens . |
| 4,307,942 | 12/1981 | Chahroudi . |
| 4,499,441 | 2/1985 | Lynch et al. . |
| 4,521,682 | 6/1985 | Murakami et al. . |
| 4,657,345 | 4/1987 | Gordon . |
| 4,707,303 | 11/1987 | Buckley et al. .................. 350/311 |
| 4,713,795 | 12/1987 | Woike et al. . |
| 4,719,342 | 1/1988 | Cohn et al. . |
| 4,737,000 | 4/1988 | Garlick et al. . |
| 4,754,384 | 6/1988 | Levy et al. . |
| 4,818,898 | 4/1989 | Anderson et al. ............... 350/311 |
| 4,855,078 | 8/1989 | Leslie ............................. 252/582 |

OTHER PUBLICATIONS

Muirhad, C. M.; "Liquids and Aerial Application"; IEE Callop on High Temp. Superconductors; Dig. 114, pp. 7/1-4, Nov. 9, 1988, Abst. only.

Kharmas et al.; "High Tec Superconducting . . . Antenna"; Electron. Lett., vol. 24, #8, pp. 460-461, Apr. 14, 1988; Abst. only.

Pankratov et al.; "Spectral Manifestation . . . "; Opt. Spektroch., vol. 41, #6, pp. 983-989, Dec. 1976; Abst. Only.

Primary Examiner—Nelson Moskowitz
Attorney, Agent, or Firm—Bobby D. Scearce; Donald J. Singer

[57] ABSTRACT

An optical reflection band filter structure for selectively blocking radiation within a preselected range of wavelengths is described which comprises a plurality of multipole elements of preselected configuration deposited with prescribed spacing in a periodic array on a substrate of dielectric material, each multipole configuration comprising a central element having shape corresponding to the overall shape of the multipole and a plurality of adjacent connected segments, all comprising a material characterized by transition from superconducting phase to insulating phase, upon being heated to a characteristic transition temperature, the central element having predetermined thickness and each transition segment disposed outwardly from the center element having higher transition temperature than the next inwardly disposed transition segment, and the central element.

37 Claims, 2 Drawing Sheets

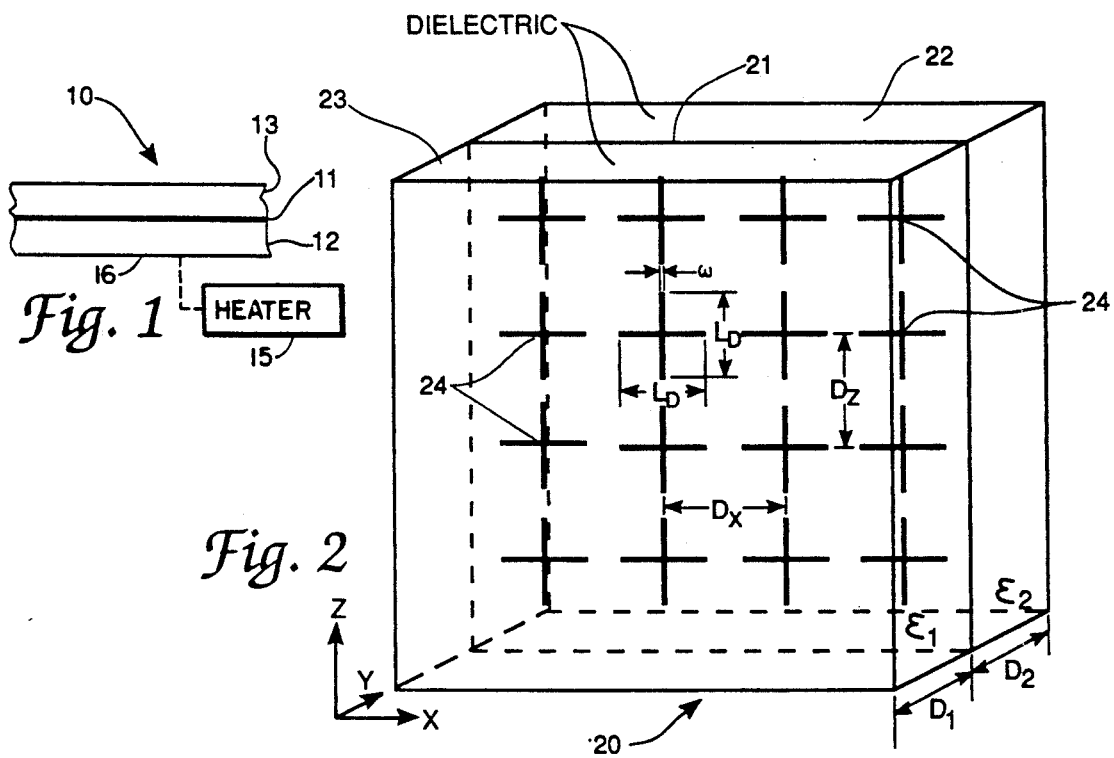
Fig. 1
Fig. 2
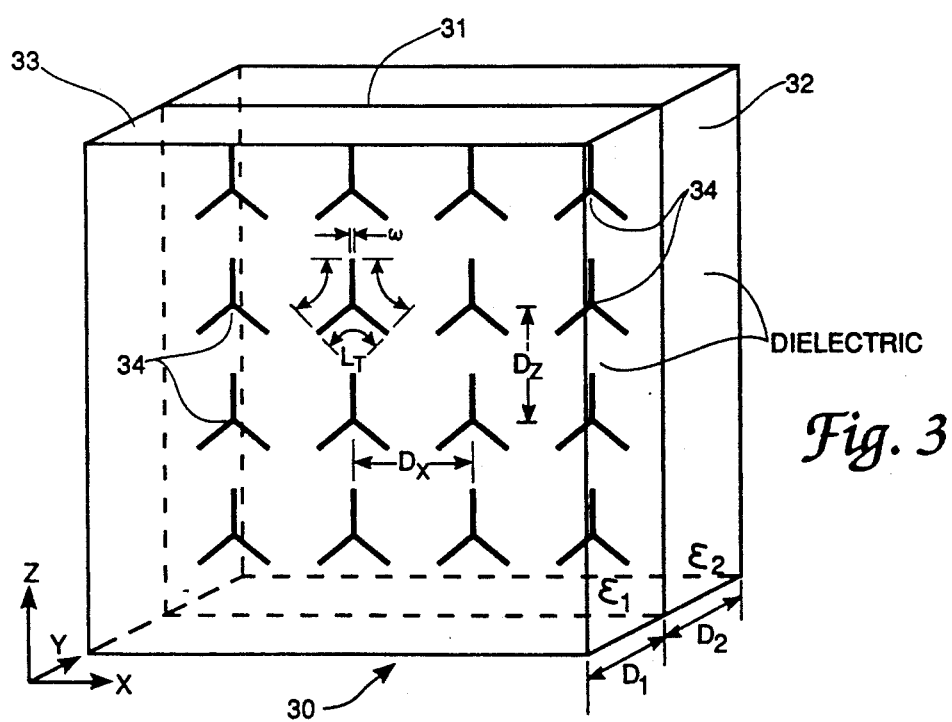
Fig. 3

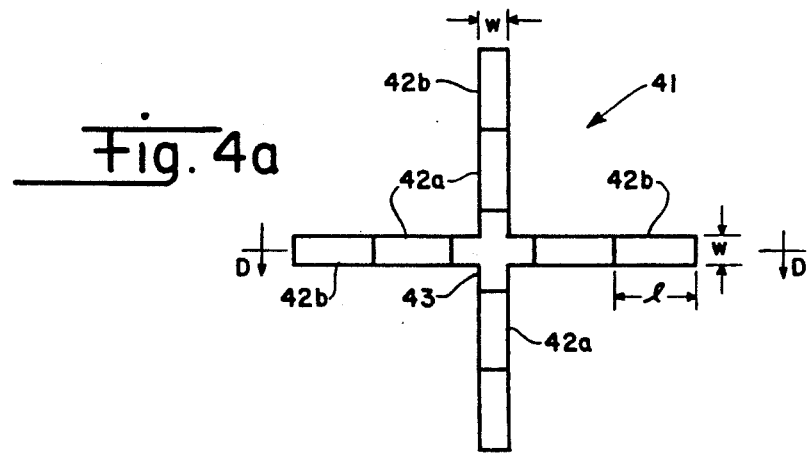
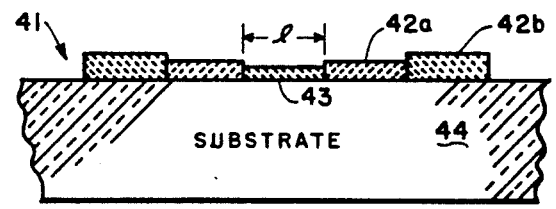
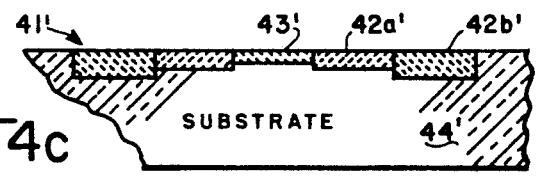
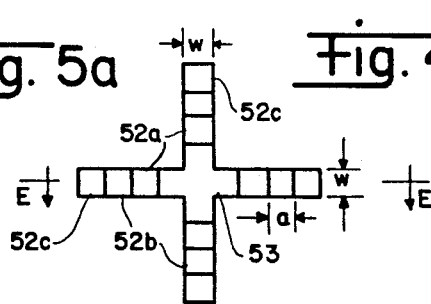
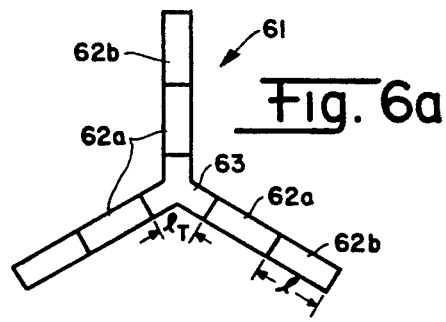
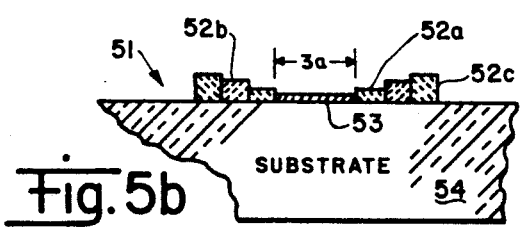
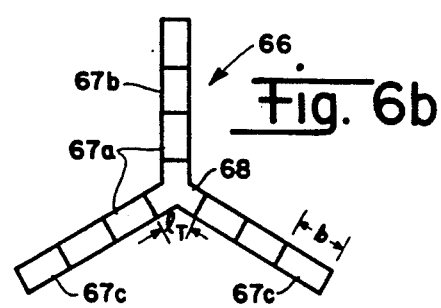
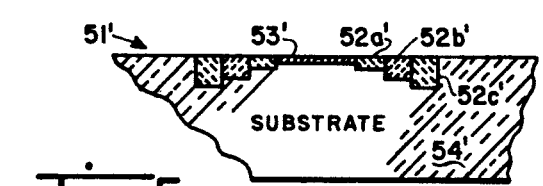

SUPERCONDUCTING SEARCHING FILTER

RIGHTS OF THE GOVERNMENT

The invention described herein may be manufactured and used by or for the Government of the United States for all governmental purposes without the payment of any royalty.

CROSS-REFERENCE TO RELATED APPLICATIONS

The invention described herein is related to copending application Ser. No. 07/172,119 filed Feb. 23, 1984. entitled "Inorganic Filter"; Ser. No. 06/841,389 filed Mar. 5, 1986, entitled "Reflection Filter"; Ser. No. 06/841,388 filed Mar. 5, 1986, entitled "Searching Filter"; Ser. No. 07/386,799 filed Jul. 20, 1989, entitled "Superconducting Submicron Filter"; and Ser. No. 07/386,796 filed Jul. 20, 1989, entitled "Superconducting Reflection Filter", each of which have the same assignee as that of the present application.

BACKGROUND OF THE INVENTION

The present invention relates generally to laser hardened materials and structures, and more particularly to a novel optical filter structure for selectively blocking laser radiation of predetermined wavelength while passing radiation of other wavelengths.

Optical switching devices comprising transition or switching materials which are optically transparent in one state but which transform to an opaque metallic state when heated to a characteristic transition temperature are well developed for applications such as optical filters, modulators, laser output couplers and the like. These devices are generally characterized by a transition from substantial transparency below the characteristic transition temperature to substantial opacity above that temperature, at all wavelengths.

In accordance with the teachings of copending application Ser. No. 07/172,119, which teachings are incorporated herein by reference, an optical filter structure was described for selectively blocking radiation of predetermined wavelength comprising a layer of material characterized by transition from non-metal to metal, corresponding to a change from transmissive to reflective states upon being heated to a characteristic transition temperature, deposited on a slab of dielectric material in the form of a plurality of multipole elements in an array of predetermined spacing between adjacent rows and columns of the array. The filter of the 07/172,119 application is characterized by substantial transparency to all radiation wavelengths below its characteristic transition temperature, and opacity only to the predetermined wavelength, and substantial transparency to all other wavelengths, above the transition temperature, and is constructed by applying a film of thermal switching material in the form of an array of microwave-type multipole elements of optical dimensions being applied to a dielectric slab, or sandwiched between two dielectric slabs.

For purposes of describing the invention and defining the scope thereof, the term "optical" shall, in accordance with the customary usage, be defined herein to include only ultraviolet, visible, near infrared, mid-infrared and far infrared regions of the electromagnetic spectrum lying between about 0.1 to about 1000 microns (see e.g. *Optical Physics*, by Max Garbuny, Academic Press, New York, 1965, pp 1–6), and more specifically to the range of from about 0.2 micron, the approximate lower limit of operation of fine quality quartz lenses (Garbuny, p 280), to about 50 microns, the approximate upper limit of operation of long wavelength transmitting material such as KRS-5 (thallium bromide-iodide ionic crystal) (Garbuny, p 282).

The invention provides a substantially improved optical reflection band filter capable of actively or passively sweeping a preselected range of wavelengths and locking in on a wavelength within that range to effectively block that wavelength while substantially passing all others. The searching filter of the invention is constructed by depositing a periodic array of microlithographic patterns of thermal switching material in the form of microwave antenna type multipole elements of optical dimensions, preselected according to a desired characteristic wavelength range to be swept. The elements comprise small interconnected segments of semiconductor -to-insulator phase transition materials deposited on a dielectric substrate, each successive segment from the center of each pattern outwardly having preselected thickness smaller than the next inwardly situated section. Upon heating the array by a controllable heater contacting the filter or by impinging laser radiation, the element segments switch from superconducting to insulating at different temperatures for each set of segments, providing wavelength sweeping over the characteristic preselected wavelength reflection band. The invention therefore is a substantial improvement over the totally opaque switching reflection filter, the non-switching metallic element array reflection-band filter, the fixed wavelength switching metallic element reflection band filter, and other wavelength responsive laser hardening devices.

It is therefore a principal object of the invention to provide an improved optical filter.

It is a further object of the invention to provide an optical filter for selectively blocking laser radiation of particular wavelength while passing radiation of other wavelengths.

It is yet a further object of the invention to provide a switchable filter incorporating insulating-to-superconducting materials to provide selective wavelength filtering.

It is yet another object of the invention to provide an optical filter having fast response time.

It is yet a further object of the invention to provide a filter capable of sweeping a reflection band to reflect a preselected wavelength within that band.

These and other objects of the invention will become apparent as the detailed description of representative embodiments proceeds.

SUMMARY OF THE INVENTION

In accordance with the foregoing principles and objects of the invention, an optical reflection band filter structure for selectively blocking radiation within a preselected range of wavelengths is described which comprises a plurality of multipole elements of preselected configuration deposited with prescribed spacing of optical dimensions in a periodic array on a substrate of dielectric material, each multipole configuration comprising a central element having shape corresponding to the overall shape of the multipole and a plurality of adjacent connected segments, all comprising a material characterized by transition from superconducting phase to insulating phase upon being heated to a characteristic transition temperature, the central element having predetermined thickness and each transition segment disposed outwardly from the central element having higher transition temperature than the next inwardly disposed transition segment and than the central element.

DESCRIPTION OF THE DRAWINGS

The invention will be more clearly understood from the following detailed description of representative embodiments thereof read in conjunction with the accompanying drawings wherein:

FIG. 1 is a fragmentary sectional view of a layered structure representative of the optical filter of the invention;

FIG. 2 is a perspective view of a layered structure incorporating an array of crossed dipoles according to the invention;

FIG. 3 is a perspective view of a layered structure incorporating an array of tripoles according to the invention;

FIG. 4a is a plan view of a representational crossed dipole element structured according to the invention;

FIG. 4b is a sectional view of the element of FIG. 4a taken along line D—D;

FIG. 4c is a sectional view similar to FIG. 4b of an alternative structure for a multipole element of the invention;

FIG. 5a is a plan view of another representative crossed dipole element structured according to the invention;

FIG. 5b is a sectional view of the element of FIG. 5a taken along line E—E;

FIG. 5c is a sectional view similar to FIG. 5b of an alternative structure for a multipole element of the invention; and FIGS. 6a and 6b are plan views of two embodiments of tripole elements structured according to the invention.

DETAILED DESCRIPTION

Referring now to FIGS. 1-3, shown therein are layered structures including dipole and tripole elements and representative of arrays which may be deposited according to the teachings of the invention. As shown in FIG. 1, filter 10 may comprise layer 11 of an array of elements deposited in predetermined pattern and spacing as herein described on a supporting substrate 12 of dielectric material A second slab or layer 13 of dielectric material may be applied over layer 11 to form the sandwich structure shown, if desired. Dielectric substrate 12 or slab 13 may include semiconductors, ionic crystals, covalent crystals, glasses, polycrystalline materials, amorphous materials, polymers, and other organic materials, all generally characterized as transparent insulators or semiconductors, substantially transparent to optical wavelengths in the range from about 0.2 to 50.0 microns.

Layer 11 comprises a periodic array of microwave antenna type multipole elements of novel structure deposited on substrate 12. As shown in FIGS. 2 and 3, layers 21,31 comprising representative arrays of multipole elements of respective filters 20,30 may comprise a rectilinear, square array of crossed dipoles 24 or tripoles 34, respectively deposited on substrates 22,32 of substantially transparent dielectric material of dielectric constant $\epsilon_2$, and covered by optional slabs 23,33 of dielectric constant $\epsilon_1$. Layers 21,31 of filters 20,30 may be otherwise configured, within the scope of these teachings, in other geometric forms, and may include single dipoles, grids, crosses, circles, and staggered multipole patterns, as might occur to one with skill in the field of the invention. Further, selected multipole patterns may be deposited to any desired thickness as appropriate, in any periodic array and orientation with respect to each other, within the contemplation of the teachings herein, as to define a hexagonal, diamond, circular or other desired pattern as a particular application requires.

Referring now to FIGS. 4a and 4b, shown therein are a plan view of a representative multipole element of the invention in the form of a crossed dipole element 41, and a sectional view of element 41 taken along line D—D. Referring specifically to FIG. 4a, element 41 comprises a crossed pattern of a plurality of abutting segments 42 and a central cross-shaped element 43 (all preferably separately deposited on substrate 44 as herein described). Central element 43 has a shape (cross in FIG. 4a) corresponding to the overall shape of the multipole element. Segments 42 and central elements 43 of the FIG. 4a embodiment are of preselected length l and width w. The crossed dipoles and tripoles shown in the figures, as well as other multipole elements contemplated herein, comprise thermal switching segments of substantially equal length which undergo a superconducting to insulating phase transition upon heating to a relatively high critical temperature $T_c$. These materials may include, but are not necessarily limited to, ceramics such as the Ba—La—Cu—O system including $Ba_x La_{5-x} Cu_5 O_{5(3-y)}$, $Ba_x La_{1-x} CuO_{3-y}$, and $Ba_x La_{2-x} CuO_{4-y}$; the Sr—La—Cu—O system including $Sr_x La_{2-x} CuO_{4-y}$ and $(Sr_x La_{1-x})_2 CuO_{4-x}$; the Y—Ba—Cu—O system including $YBa_2 Cu_3 O_{9-y}$ and $Y_{0.87} Ba_{1.53} Cu_3 O_y$; the Ba—Sr—La—Cu—O system including $(Ba,Sr)_x La_{2-x} CuO_{4-y}$; the La—Cu—O system including $La_2 CuO_4$; and the Ba—Pb—Bi—O system including $BaPb_{1-x} Bi_x O_3$, and organic semiconductors such as copper-doped, silver-doped, or gold-doped tetracyanoquinodimethane (TCNQ). Insulating-to-superconducting transition temperatures $T_c$ range from about 0.3 to 120° K. Segments 42 and central element 43 of transition material may be deposited using substantially standard deposition techniques including x-ray, electron beam or ion beam lithography, photolithography, or other appropriate techniques as would occur to one with skill in the applicable art. X-ray lithography may offer optimum resolution.

Referring now to FIG. 4b, each segment 42a,b of crossed dipole element 41 has thickness depending on its position from the center of element 41. Segments 42a all have predetermined thicknesses substantially equal to each other and smaller than that of adjoining central element 43. The more distal segments 42b have thickness smaller than that of segments 42a, and as discussed below, the temporal switching of element segments differ slightly according to their respective thicknesses, the thinner segments switching faster under constant heat input. In a multipole structure of the invention comprising a number of segments 42 greater than that depicted in the figures, each radially outwardly positioned segment 42 has thickness smaller than the next radially inwardly disposed segment 42, each set of segments 42 having characteristic predetermined transition rate corresponding to its thickness and position in element 41.

Referring now to FIG. 4c, shown therein is an alternative structure for dipole element 41 wherein central element 43' and surrounding segments 42a', 42b' of transition material are embedded into substrate 44' rather than deposited on a surface as in the FIG. 4a embodiment. In the structure of FIG. 4c, substrate 44' is first prepared with a stepwise pattern etched, machined, milled or otherwise provided at predetermined depths corresponding to the preselected thicknesses for central element 43' and segments 42a',42b'. The stepwise depressions thus provided are then filled to surface level of substrate 44' as suggested in FIG. 4c to provide dipole element 41' with the desired structural configuration.

Referring now to FIGS. 5a,b,c. shown therein are embodiments of a structure for dipole element 51,51' alternate to that of FIGS. 4a,b,c. Dipole elements 51 of FIG. 5a,b comprises a central element 53 and a plurality of adjoining segments 52 deposited on the surface of substrate 52 in manner similar to that described for dipole element 41. Central element 53 has a preselected length substantially greater than that of each segment 52a,b,c. In the specific example depicted in FIGS. 5a,b,c and discussed below, element 53 has length 3a where each segment 52 has length a. Further, element 51' has similar configuration to that of element 51 but is deposited within substrate 54' in stepwise fashion similar to that characterizing dipole element 41'.

Referring now to FIGS. 6a and 6b, shown therein are plan views of two representative multipole elements of the invention in the form of tripoles 61,66. Tripole 61 comprises a central element 63 having shape corresponding generally to that of tripole 61 and abutting segments 62a,b all of predetermined dimensions and deposited in manner corresponding to that characterizing dipole elements 41,41'. Tripole 66 has central element 68 of length (see FIG. 3) substantially greater than each abutting segment 67 a,b,c similar to the structures of dipoles 51,51'.

An alternative structure to those described above for varying transition temperatures of the element segments includes element segments comprising different materials or otherwise characterized by different critical temperatures.

Referring now again to FIGS. 2 and 3, the crossed dipoles 24 of layer 21 of FIG. 2 lie in the x-z plane coincident with layer 21. Dipoles 24 are separated by distances of optical dimensions designated by $D_x$ between adjacent columns and $D_z$ between adjacent rows and have predetermined overall length $L_D$ and width w. Dielectric substrate 22 has thickness $D_2$ and dielectric constant $\epsilon_2$, and slab 23 has a thickness $D_1$ and dielectric constant $\epsilon_1$, and each are preferably transparent to radiation over substantially all wavelengths of interest. Therefore, light traveling, for example, along the y coordinate impinges first upon dielectric 23. The area of each crossed dipole is given by $2wL_D$ and the fractional cross-sectional area $R_d$ occupied by the crossed dipoles 24 may be expressed as, $$R_d = 2wL_D/D_xD_z \qquad (1)$$

For the configuration of FIG. 3 comprising tripoles 34, a similar analysis applies. Referring now specifically to FIG. 3, the area of each tripole 34 may be expressed as $3wL_T/2$ and the fractional cross-section area $R_t$ occupied by tripoles 34 may be expressed as:

$$R_t = 3wL_T/2D_xD_z \qquad (2)$$

Similar analysis may be performed to obtain equivalent expressions for R for multipole elements in other configurations.

At a temperature above the characteristic transition temperatures of the respective central elements and segments, the filter of the invention is substantially transparent to all wavelengths. The relationship between resonant wavelengths and physical dimensions of the multipole elements are as follows. The size of the switched element segments of the crossed dipoles in terms of a reflection band centered about $\lambda_1$ is approximated by, $$l \approx 0.5(\lambda_1/N_{eff}) \qquad (3)$$

and for the central tripole element by, $$l_T = 0.55(\lambda_1/N_{eff}) \qquad (4)$$

where $N_{eff}$ is the effective index of refraction given by, $$N_{eff} = [(\epsilon_1 + \epsilon_2)/2]^{\frac{1}{2}} \qquad (5)$$

where each respective dielectric constant is effectively equal to the square of the corresponding material refractive index. Thus, the product of element length times effective refractive index may lie un the range of about 0.1 microns to about 25 microns.

If the reflection band centered about $\lambda_1$ coincides with an invasive wavelength $\lambda_0$, the filter will successfully reflect the invasive radiation. If the filter is not tuned to $\lambda_0$ the substrate (and array) must be further cooled to decrease the substrate temperature until the second set of segments (e.g. 42a of FIG. 4a) is switched, at which point the resonance of the multipole is determined by the central element plus the adjacent segments 42a. For the crossed dipoles of FIG. 4a, the resonance condition is given by, $$l + 2l = 3l = 0.5(\lambda_2/N_{eff}) \qquad (6)$$

and for tripoles of FIG. 6a the resonance condition is given by, $$l_T + 2l = 0.55(\lambda_2/N_{eff}) \qquad (7)$$

By switching the appropriate number of successive outwardly placed segments in a multipole element having any desired number of segments as just suggested, the resulting reflection band centered about $\lambda_2$ can be made to coincide with an invasive wavelength $\lambda_0$, and the filter will successfully reflect the invasive laser radiation. The filter may be locked on to $\lambda_2$, but if the filter is then allowed to warm, the outermost switched segments will switch back to the transparent state, and the center of the reflection band will revert back to $\lambda_1$. The general resonance condition for crossed dipoles will be, $$l + (J-1)2l \approx 0.5(\lambda_J/N_{eff}) \qquad (8)$$

and for tripoles $$l_T + (J-1)2l \approx 0.55(\lambda_J/N_{eff}) \qquad (9)$$

Assume the maximum continuous length of the multipole with the central element and all transition segments in the metallic state at a given temperature in a crossed dipole element 41 to be $L_D$ and the corresponding tripole 61 length is $L_T$. The corresponding resonant wavelength is labeled $\lambda_{max}$. $L_D$ and $L_T$ being given, the other dimensions of the multipole are selected. The spacing between rows and columns is kept below $\lambda_{max}/2$ to avoid grating lobes, but the spacing must be large enough that adjacent elements do not touch. A best estimate of minimum spacing may be a value greater than about one-tenth the length of the elements (i.e., about one-twentieth the design wavelength). In most cases this implies, $$D_x = D_z \approx L_D \text{ or } L_T. \qquad (10)$$

The size of the w affects the width of the reflection band, which is a function of w/l. The exact mathematical dependance is exceedingly complicated, but the reflection bandwidth increases with element width. The element width parameter is best determined empirically, a major consideration being the transmission required at temperatures above $T_c$ as governed by Eqs (1) and (2).

Consider as an example that a simple filter of the crossed dipole array configuration of FIGS. 2 and 4a is required to operate in the 1-14 micron range. A dielectric slab 22 of Zns (refractive index = 2.25) may be selected. Assume no covering slab 23 is used (i.e., $\epsilon_1 = 1.0$). From Eq (5)

$$N_{eff} = [\tfrac{1}{2} + (2.25)^2/2]^{\tfrac{1}{2}} = 1.74$$

Assume that laser radiation at 2.00, 6.00, and 10.0 microns is to be blocked. When each central element and all segments are switched, Eq (8) yields, $$5l = 0.5(10.0 \text{ microns})/1.74 = 2.87 \text{ microns, and}$$

$$l = 0.574 \text{ microns}.$$

With only the center element and first adjacent segments switched, the resonance condition becomes, $$3l = 0.5(\lambda_2/1.74)$$

$$\lambda_2 = 6.00 \text{ microns}.$$

With only the center elements switched, resonance of the arrays is $$l = 0.5(\lambda_1/1.74)$$

$$\lambda_1 = 2.00 \text{ microns}$$

Letting Dx=Dz=3.00 microns satisfies the requirement that Dx and Dz are less than $\lambda_0/2$ and ensures that elements 24 in adjacent rows and columns do not touch. The value of w is determined emperically to obtain the desired bandwidth, but some limitations are imposed by the inband absorption to be tolerated below the transition temperature. For w=0.2 micron, the absorption calculated from Eq (1) for $R_d$ is, $$A_b = R_d \frac{(2)(0.2 \text{ microns})(2.87 \text{ microns})}{(3.00 \text{ microns})^2} = 0.218$$

or about 13%. Thus, a trade-off is to be made among bandwidth, transmission of unswitched state filter, and limitations of present microlithographic techniques.

In representative embodiments of the reflection filter of FIGS. 2-6b, the substrate is placed within a cryogenic cooler but is locally actively heated, as by heater 15, and its temperature controlled by any of various methods. For example, substrate 12 may itself be used as a heater with suitable electric leads attached to substrate 12; in this example it is desirable for substrate 12 to be a semiconductor. Alternatively, a transparent and electrically conducting layer 16 of tin oxide or equivalent material may be disposed on substrate 12, as suggested in FIG. 1 with suitable electrical leads attached near the edge of the substrate. In a further alternative, layer 16 may comprise a grid of resistive metal wire (e.g., nichrome), the grid dimensions being selected to avoid diffraction effects which may interfere with the antenna pattern operation characterizing the filter of the invention.

Above the critical temperature $T_c$ of the center element segments, the filter is transparent to all wavelengths of incoming radiation. The only absorption is that by the non-metallic materials of the crossed-dipole and tripole elements. Assuming total absorption by these elements, and neglecting reflection losses of the slabs which are small and can be overcome by antireflection coatings, the optical absorption is given by Eqs (1) and (2).

The crossed-dipole and tripole center element segments are cooled until they reach temperature $T_c$. A high value for $T_c$ is desired; for example, $T_c$ is about 85° K for the new high temperature superconducting materials. At temperatures equal to or lower than $T_c$ the elements behave as metallic periodic antenna arrays. The periodic arrays of antenna elements will produce moderately narrow reflection bands of 93-97% reflectivity about a central wavelength. The exact details of the calculation of the peak value of the reflection band are exceedingly complex and can only be evaluated numerically. In addition, final fine tuning of the reflection band is normally an empirical process, the details of which are not presented. The calculation of the last few percent reflectivity are beyond the scope hereof.

As a further embodiment of the invention, the central wavelength of the reflection band may also be passively varied by heating or electrical field of impinging laser radiation. In this case the filter is to be maintained at a temperature slightly below $T_c$, causing all of the elements to be in a superconducting state, and the filter reflection band is located at the longest wavelength position. As more heat is added to the filter, the element segments progressively switch from the outermost to innermost, until the filter locks on to wavelength $\lambda_0$.

The invention therefore provides an optical reflection band filter device for actively or passively sweeping a preselected reflection wavelength band to block preselected discrete, tunable wavelengths within that band while passing substantially all other wavelengths. The response of the filter is wavelength independent prior to switching, and absorption losses (less than about 10-13% due mostly to the geometry of the array elements) are minimized due to the switching mechanism which characterizes filter operation. Because of the small thermal mass and thermal isolation of the element segments, the filter has a time constant for switching substantially faster than that for existing devices characterized by opaque switching or by fixed wavelength switching, may comprise optical substrates configured in substantially any size and shape, and may be effective in its function at angles of incidence of impinging radiation up to about 80° from normal. The invention may therefore find substantial use as a protective optical filter against laser weapons.

It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An optical filter structure for selectively blocking radiation of predetermined wavelength comprising:
   (a) a first layer of dielectric material; and
   (b) a plurality of multipole elements in predetermined periodic array and spacing on said first layer, each multipole element including:
      (i) a central element of predetermined length, width and thickness and of shape generally corresponding to that characterizing each multipole element;
      (ii) a plurality of abutting segments disposed adjacent said central element, said segments having predetermined length and width corresponding substantially to that of said central element; and
      (iii) each of said central element and segments comprising transition material, characterized by a transition from superconducting phase to insulating phase upon being heated to a characteristic transition temperature.

2. The filter structure of claim 1 wherein each transition segment disposed outwardly of said central element has a characteristic transition temperature greater than that of the next inwardly disposed segment and of said central element.

3. The filter structure of claim 1 wherein said central element and said segments are of substantially equal length.

4. The filter structure of claim 1 wherein said segments are of substantially equal length less than that of said central element.

5. The filter structure of claim 2 wherein each segment disposed outwardly of said central element has thickness smaller than the next inwardly disposed segment, the innermost segments having thickness smaller than that of said central element.

6. The filter structure of claim 2 wherein each segment disposed outwardly of said central element has a transition material different from that of the next inwardly disposed segment and said central element.

7. The filter structure of claim 1 wherein said periodic array is rectangular with predetermined spacing between adjacent rows and columns.

8. The filter structure of claim 1 wherein said periodic array is hexagonal.

9. The filter structure of claim 1 further comprising a second layer of dielectric material covering said array.

10. The filter structure of claim 1 wherein said transition material comprises a ceramic.

11. The filter structure of claim 10 wherein said ceramic is a barium-lanthanum-copper oxide.

12. The filter structure of claim 10 wherein said ceramic is a strontium-lanthanum-copper oxide.

13. The filter structure of claim 10 wherein said ceramic is a yttrium-barium-copper oxide.

14. The filter structure of claim 10 wherein said ceramic is a barium-strontium-lanthanum-copper oxide.

15. The filter structure of claim 10 wherein said ceramic is a lanthanum-copper oxide.

16. The filter structure of claim 10 wherein said ceramic is a barium-lead-bismuth oxide.

17. The filter structure of claim 1 wherein said transition material is tetracyanoquinodimethane doped with a metal selected from the group consisting of copper, silver and gold.

18. The filter structure of claim 1 wherein said multipole elements comprise crossed dipoles.

19. The filter structure of claim 1 wherein said multipole elements comprise tripoles.

20. The filter structure of claim 1 further comprising means for controllably heating said plurality of multipole elements.

21. An optical reflection filter structure comprising:
   (a) a first layer of dielectric material; and
   (b) a plurality of multipole elements in predetermined periodic array and spacing on said first layer, each multipole element comprising:
      (i) a central element of predetermined length, width and thickness and of shape generally corresponding to that characterizing each multipole element;
      (ii) a plurality of abutting segments disposed adjacent said central element, said segments having predetermined length and width corresponding substantially to that of said central element; and
      (iii) each of said central element and segments comprising transition material characterized by a transition from superconducting phase to insulating phase upon being heated to a characteristic transition temperature, each successive said transition segment outwardly of said central element having thickness smaller than the next inwardly disposed segment, the innermost transition segments having thickness smaller than that of said central element.

22. The filter structure of claim 21 wherein said central element and said segments are of substantially equal length.

23. The filter structure of claim 21 wherein said segments are of substantially equal length less than that of said central element.

24. The filter structure of claim 21 wherein said periodic array is rectangular with predetermined spacing between adjacent rows and columns.

25. The filter structure of claim 21 wherein said periodic array is hexagonal.

26. The filter structure of claim 24 further comprising a second layer of dielectric material covering said array.

27. The filter structure of claim 21 wherein said transition material comprises a ceramic.

28. The filter structure of claim 27 wherein said ceramic is a barium-lanthanum-copper oxide.

29. The filter structure of claim 27 wherein said ceramic is a strontium-lanthanum-copper oxide.

30. The filter structure of claim 27 wherein said ceramic is a yttrium-barium-copper oxide.

31. The filter structure of claim 27 wherein said ceramic is a barium-strontium-lanthanum-copper oxide.

32. The filter structure of claim 27 wherein said ceramic is a lanthanum-copper oxide.

33. The filter structure of claim 27 wherein said ceramic is a barium-lead-bismuth oxide.

34. The filter structure of claim 21 wherein said transition material is tetracyanoquinodimethane doped with a metal selected from the group consisting of copper, silver and gold.

35. The filter structure of claim 21 wherein said multipole elements comprise crossed dipoles.

36. The filter structure of claim 21 wherein said multipole elements comprise tripoles.

37. The filter structure of claim 21 further comprising means for controllably heating said plurality of multipole elements.

* * * * *